(12) United States Patent
Meinander (10) Patent No.: US 6,723,205 B1
(45) Date of Patent: Apr. 20, 2004

(54) DEGASSING CENTRIFUGAL APPARATUS WITH ENERGY RECOVERY, PROCESS FOR DEGASSING A FLUID AND PROCESS FOR PRODUCING PAPER OR BOARD

(75) Inventor: Paul Meinander, Grankulla (FI)

(73) Assignee: FOM Technology Oy AB, Helsingfors (FI)

( * ) Notice: Subject to any disclaimer, the term of this patent is extended or adjusted under 35 U.S.C. 154(b) by 0 days.

(21) Appl. No.: 09/980,281

(22) PCT Filed: Jun. 2, 2000

(86) PCT No.: PCT/FI00/00496

§ 371 (c)(1),
(2), (4) Date: Apr. 17, 2002

(87) PCT Pub. No.: WO00/74811

PCT Pub. Date: Dec. 14, 2000

(30) Foreign Application Priority Data

Jun. 3, 1999 (FI) .................................................. 991271

(51) Int. Cl.$^7$ ................................................. D21F 1/66
(52) U.S. Cl. ................. 162/189; 162/190; 162/43; 162/200; 55/421; 55/409; 55/410; 55/412; 95/261; 95/241
(58) Field of Search ..................... 55/409, 410, 412, 55/421; 95/241, 261; 162/189, 190, 43, 200

(56) References Cited

U.S. PATENT DOCUMENTS

| | | |
|---|---|---|
| 3,203,354 A | 8/1965 | Pedersen |
| 3,323,465 A | 6/1967 | Stillebroer |
| 3,856,483 A | 12/1974 | Rumpf et al. |
| 3,973,930 A | 8/1976 | Burgess |
| 4,030,897 A * | 6/1977 | Pelzer et al. ................ 55/42 |
| 4,201,555 A | 5/1980 | Tkach |
| 4,410,337 A | 10/1983 | Gullichsen |
| 4,516,987 A | 5/1985 | Niggemann |
| 4,600,413 A | 7/1986 | Sugden |
| 4,675,033 A | 6/1987 | Fellman et al. |
| 4,908,048 A | 3/1990 | Hofmann et al. |
| 5,039,320 A | 8/1991 | Hoglund et al. |
| 5,861,052 A | 1/1999 | Meinander |

FOREIGN PATENT DOCUMENTS

| | | |
|---|---|---|
| EP | 0 298 442 | 1/1989 |
| EP | 0 337 394 | 10/1989 |
| WO | 92 03613 | 3/1992 |
| WO | 93 23135 | 11/1993 |
| WO | 9619276 | 6/1996 |

OTHER PUBLICATIONS

Massey, "Mechanics of Fluids", Van Nostrand Reinhold Co., Ltd. London, (1986), pp. 385–410, equivalent to pp. 334–359 in the 1971 edition.

* cited by examiner

Primary Examiner—Peter Chin
Assistant Examiner—Mark Halpern
(74) Attorney, Agent, or Firm—Browdy and Neimark (57) ABSTRACT

The invention relates to a degassing centrifugal apparatus such as a pump having energy recovery means and to a process for degassing a fluid. The apparatus has a rotatable hollow rotor connected to a fluid inlet at one end and a liquid outlet at the opposite end. A gas exhaust is connected to the center of the apparatus. The apparatus has at its inlet end means for bringing a fluid to rotate on the inner wall of said rotor. The apparatus comprises a turbine at its outlet end recovering excess dynamic energy from the rotating fluid. The apparatus is especially useful for centrifugal degassing of backwater in the production of paper or board machine.

10 Claims, 5 Drawing Sheets

DEGASSING CENTRIFUGAL APPARATUS WITH ENERGY RECOVERY, PROCESS FOR DEGASSING A FLUID AND PROCESS FOR PRODUCING PAPER OR BOARD

REFERENCE TO RELATED APPLICATIONS

The present application is the national stage under 35 U.S.C. 371 of international application PCT/FI00/00496, filed Jun. 2, 2000 which designated the United States, and which international application was published under PCT Article 21 (2) in the English language.

The present invention relates to a degassing centrifugal apparatus such as a pump and to a process for centrifugal degassing a liquid, especially backwater in the production of paper or board in a paper machine.

Backwater drained through a forming fabric in a papermaking process, normally, contains a large amount of enclosed air. Since the short circulation of a paper machine requires a particularly constant flow, disturbing air is normally removed by conducting the drained backwater, by means of special pipe or channel systems, from the dewatering box or boxes to an open backwater tank. The deaerated water is then pumped back to the fiber process of the short circulation preceding sheet forming. Other liquids which require air free pumping are, among others, black liquor, deinking sludge and stock, coating colour, etc.

Pumps, which are able to separate gas from a fluid to be pumped are well known as such, but the objective of such pumps is normally just to remove a sufficient portion of the gas to enable regular pumping. The known pumps are normally not capable of removing enough gas for achieving the degree of freedom of airs which is required for using the fluid directly for example in a papermaking process without further deaeration.

Examples of prior art pumps capable of uniformly pumping fluids which contain gas are disclosed in Patents such as U.S. Pat. No. 4,410,337 and U.S. Pat. No. 5,039,320. Said pumps are so called MC-pumps developed for pumping high consistency (about 5% to 20%) pulp which must be fluidized in the suction channel of the pump, whereby air is separated through shear and centrifugal forces. The separated air concentrates in the center of the pump and is discharged by various means. Due to the small separation volume and high viscosity of the fluids to be pumped the separation of liquid and gas is not complete in the prior art pumps mentioned above. Consequently, separation of solid material and liquid from the discharged air is further required as taught for instance in Patent Applications EP 337394 and EP 298442.

International Patent Application published as WO 92/03613 discloses a stock feeding arrangement and process wherein a fiber suspension is pumped by means of "modified" versions of the MC-pumps mentioned above. However, the specification does not explain how these pumps are to be modified.

Other means for separating gas from fluids, or for pumping fluids containing or developing vapor are disclosed in Patents such as U.S. Pat. No. 3,203,354, U.S. Pat. No. 3,323,465, U.S. Pat. No. 3,856,483, U.S. Pat. No. 4,201,555, U.S. Pat. No. 3,973,930, U.S. Pat. No. 4,516,987, U.S. Pat. No. 4,600,413, U.S. Pat. No. 4,675,033, U.S. Pat. No. 4,908,048 and WO 93/23135.

The same applicant's U.S. Pat. No. 5,861,052, the disclosure of which is included herein by reference, discloses a gas separating pump capable of separating air and water from a mixture thereof. The pump has a fluid inlet at one end and a pumping liquid outlet at the opposite end. Between inlet and outlet there is a hollow elongated gas separating rotor and a generally central outlet for separated gas. At the outlet end of the pump the diameter of the rotor increases smoothly to form a larger diameter pumping zone. The inlet end of the pump is provided with a set of blades for distributing the incoming fluid to the rotor walls and the outlet of the pump is provided with a blade wheel for pumping the degassed liquid. The apparatus is especially well suited for the gas-free re-cycling of backwater drained through a forming fabric in a papermaking process.

A variant of the above mentioned degassing pump is described in the same applicant's patent application WO 96/19276 wherein a threshold means is provided for ascertaining that the liquid flow at the outlet end is in a tranquil flow mode. The threshold means defines the position at which the transition from rapid to tranquil flow will take place via a hydraulic jump. The hydraulic jump is described with reference to the Froude number (Fr), for instance by B. S. Massey; Mechanics of Fluids, 2nd Edition, Van Norstrand Reinhold Co. Ltd. London 1971, pp 334 to 359.

If the liquid flow in the gas separation drum of a centrifugal gas separation device is rapid at any stage, it should preferably be transformed into a tranquil state before being removed from the device in order to avoid excessive turbulence and re-entraining of gas into the liquid at the outlet end. This is particularly important in cases, where the objective is to produce a liquid essentially free of gas, as is the case for instance in the air-free pumping of back-water of a paper machine.

In many prior art pumps the axial flow is either so slow, i.e. the capacity of the pump so low, that tranquil flow prevails, or the need for a gas-free state is so secondary, that a rapid flow at the outlet can be accepted.

In a centrifugal apparatus like the one of the present invention, the rotational energy contained in the rotating liquid is used to separate the air contained in a fluid so as to provide a gas-free liquid rotating on the wall of the apparatus. The rotational energy is retained in the liquid and is used for pumping the liquid further from the apparatus. However, in some cases the rotational speed is very high and the pumping pressure may be larger than desired at the outlet end. Moreover, a high rotational velocity may cause increased energy losses in the apparatus.

An object of the present invention is to improve the function of known processes and apparatuses and to provide a means for adjusting the pressure of a liquid discharged from a centrifugal degassing apparatus at a high flow rate. The object of the invention is also to reduce the energy losses in the process. Another object of the invention is to design a rotatable degassing apparatus wherein a major portion of the energy is recovered as useful energy. It is a special object of the invention to control the hydraulic conditions in a degassing apparatus having a rapid flow of fluid.

The present invention is based on the realization that the energy losses in a degassing centrifugal apparatus may be reduced and that the rotational energy can be recovered by providing a turbine at the outlet. The unique features of the present invention are defined in the appended claims.

Thus, the present invention relates to a degassing centrifugal apparatus comprising a rotatable hollow rotor connected to a fluid inlet at one end and a liquid outlet at the opposite end, and having a gas exhaust connected to the center thereof, said apparatus having at its inlet end means for bringing a fluid to rotate on the inner wall of said rotor.

According to the invention the apparatus comprises a turbine at its outlet end.

The turbine is configured to recover at least a portion of the dynamic energy contained in a fluid flowing in said rotor. The turbine preferably forms part of the rotor structure and is rotatable with the rotor.

The apparatus of the present invention is preferably used as a pump and the outlet end of the apparatus therefor preferably comprises a stationary spiralled peripheral outlet for pumping the degassed liquid. When a pumping action is desired in addition to the degassing, the turbine is preferably located in a pumping zone formed in the rotor at its outlet end. The pumping zone preferably contains a turbine wheel extending into a stationary liquid outlet.

The turbine may have more or less distinct turbine shovels for recovering dynamic energy from the rotating liquid. In a preferred embodiment of the apparatus according to the invention the turbine wheel comprises shovels forming between themselves arcuate channels which are narrower at the outer periphery than at the inner periphery hereof.

The inlet end and the rotor body of the degassing apparatus of the present invention may be designed in various ways. It is important, however, that the fluid which is to be degassed is brought to rotate in the rotating rotor and is brought to flow axially along the rotor wall towards the outlet end and into the turbine of the present invention. The distribution of the fluid towards the rotor wall may be provided, for instance, by throttles, blades, tangential introduction of fluid, etc.

The main body of the degassing apparatus may be configured in accordance with the degassing pump described in the above mentioned U.S. Pat. No. 5,861,052 with its enlarged rotor outlet However, other designs of the apparatus are also acceptable. The degassing portion of the rotor body may be tubular or conically widening towards the outlet. The rotor body may be provided with blades or ridges along its length, although a smooth rotor wall is preferred. The outlet end of the rotor should-preferably widen in a smooth and even way towards a peripheral outlet. An abrupt transformation from degassing zone to pumping/turbine zone may, however, also be accepted provided that the degassing capacity required for any given purpose is not impaired. A final degassing action may, for instance, take place in a rotating liquid ring at the outlet.

The rotor body is preferably elongated, i.e. its length preferably significantly exceeds its width. However, a satisfactory degassing effect for many purposes may be obtained with short and wide pumps since a large diameter increases the centrifugal forces and provides a good degassing effect and the excess dynamic energy of the liquid can be recovered with the turbine according to the present invention.

In a special embodiment of the present invention the inlet means are configured as blades and/or shovels which deflect and accelerate the fluid velocity to provide a higher rotational velocity and a lower axial velocity. The turbine of the present invention is especially advantageous for the recovery of the rotational energy in this kind of embodiment.

A high peripherical velocity of the rotating fluid will give rise to a high pressure at the outlet end. The pressure may be too high for pumping and in any case in excess of what is required. The present invention aims at recovering a part at least of the excess energy and enabling its use for other purposes such as for driving the rotor.

Thus, the present invention relates to a process for degassing a fluid by centrifuging, comprising feeding a fluid containing a mixture of liquid and gas into an inlet of a rotating hollow rotor; bringing said fluid to rotate on an inner wall of said rotor; bringing said fluid to flow axially towards a liquid outlet at the opposite end of said rotor while causing said gas to separate from said liquid; directing the resulting degassed liquid into a turbine at said opposite end of said rotor; discharging said degassed liquid through said turbine; and discharging said gas through a central gas exhaust.

In the preferred process according to the invention the degassed liquid is discharged peripherically from the turbine at a pumping pressure while the turbine recovers dynamic energy from the degassed liquid.

By using the apparatus and process according to the present invention it is possible to provide an essentially complete separation of the gas which is included in the fluid mixture in gaseous (non-dissolved) form. The gas/liquid separation will be performed with high efficiency and low energy losses.

The present invention also relates to improvements in a process for producing paper or board in a paper machine including the steps of providing a papermaking stock of pulp; diluting said stock in one or more stages with backwater drained through a forming wire of said paper machine; feeding said stock through a head box of said paper machine onto said forming wire; forming a web on said forming wire while allowing water from said stock to drain through said wire; feeding said web through a press section and a drying section of said paper machine to provide paper or board. The improvement comprises pumping at least a portion of said backwater and/or diluted stock with at least one degassing centrifugal pump in accordance with the present invention.

In a preferred embodiment of the invention the backwater is substantially completely degassed in said pump. The pumping of the backwater may be performed with one, or preferably with several degassing centrifugal pumps.

A preferred embodiment of the process is provided by connecting the gas discharge to a vacuum source which may be used either to improve the effect of gas separation in the pump, or as a means of suction in a process upstream of the pump, or as means to provide a pressure drop in the inlet sufficient for distributing the fluid over the periphery of the same.

The present invention, together with additional objects and advantages thereof will be best understood from the following description, when read in connection with the accompanying drawings, of which.

In the following detailed description of the invention reference is made to the drawings, wherein the same numerals are used for the same or functionally similar parts. It is to be noted that the present pump operates largely in the same manner as the one described in the above mentioned U.S. Pat. No. 5,861,052. Reference is made to the detailed description in said patent, it being clear to those skilled in the art that the many variations in the general construction and operation of the prior art pump are applicable to large extent also to the apparatus according to the present invention.

Figure 1:
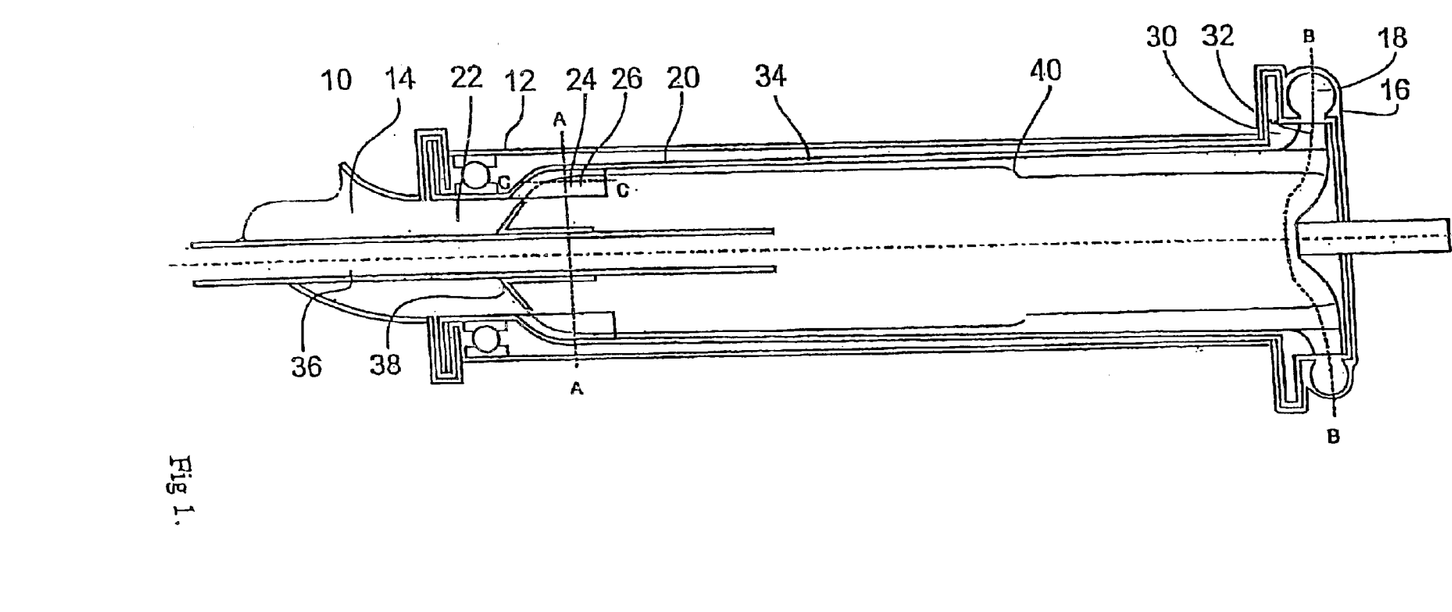
FIG. 1 shows a section of a degassing centrifugal pump according to an embodiment of the invention seen from the side.

In the preferred embodiment of the invention according to FIG. 1 the degassing pump 10 according to the invention comprises a stationary hollow tubular housing 12 with a stationary inlet pipe 14 at one end a stationary outlet spiral 16 with an outlet pipe 18 at the opposite end. Inside the housing 12 there is a hollow rotor 20 rotatably mounted in bearings. The housing 12 forms a closed space around the rotor 20. The rotor 20 comprises a rotatable inlet channel 22 connected to said stationary inlet pipe 14 and a rotatable outlet connected to said stationary outlet spiral 16.

Attached to the inner wall of the rotor 20 there is at the inlet end a set of rotatable blades 24 forming an inlet wheel 26 and at the outlet end of the pump there is a set of shovels 32 forming an outlet turbine wheel 30. Between the inlet wheel 26 and the turbine wheel 30 the degassing body of the rotor 20 is formed as a substially cylindrical drum 34. The drum 34 may also have a slightly conical design with a larger diameter at the outlet end. The drum diameter may also increase significantly immediately after the bladed wheel to increase the peripherical velocity of the gas separating drum wall.

In another embodiment of the invention the rotatable inlet and the upstream portion of the rotor may comprise a unit which is rotatable separately from the main degassing body of the rotor. Similarly, the turbine wheel may be rotatable separately from the body of the rotor.

At the center of the rotor 20 there is a stationary gas exhaust pipe 36 having on its outer periphery an annular inlet throttle plate 38 slideable along the exhaust pipe (by means not shown). The throttle plate 38 is adapted for assisting in distributing the incoming fluid to the inlet shovel wheel 26.

In the shown embodiment the pump bottom is generally flat in the sense that it has no substantial peripheral walls extending towards the inlet end of the pump but allows liquid to flow freely from said bottom and out through the annular opening which is formed between the rotor wall end and the bottom. The bottom of the pump 10 is shown as being rotatable with the rotor 20.

The bottom of the pump may alternatively be stationary and form part of the housing 12 in which case it is preferable to provide the gas exhaust pipe through the center of the stationary bottom plate.

The inner wall of the drum part 34 of the rotor 20 provides a large rotatable gas separation surface for separating entrained gas from the fluid. The gas separation surface should be sufficiently large for allowing sufficient time for the fluid to settle at the gas separation surface and for any gas enclosed in said fluid to separate as said fluid flows from inlet to outlet in said rotor 20.

In order to provide sufficient gas separation time and to obtain a favourable ratio between axial flow at said separation surface and the centrifugal force causing the separation, the drum 34 preferably has a diameter which is smaller than its length. Alternatively, a short drum may be wide enough to allow a fluid flowing slowly in the axial direction to become degassed on the surface. A high rotational velocity in a wide drum requires a high energy input. However, a part of said energy may be recovered according to the invention by a turbine.

Figure 2:
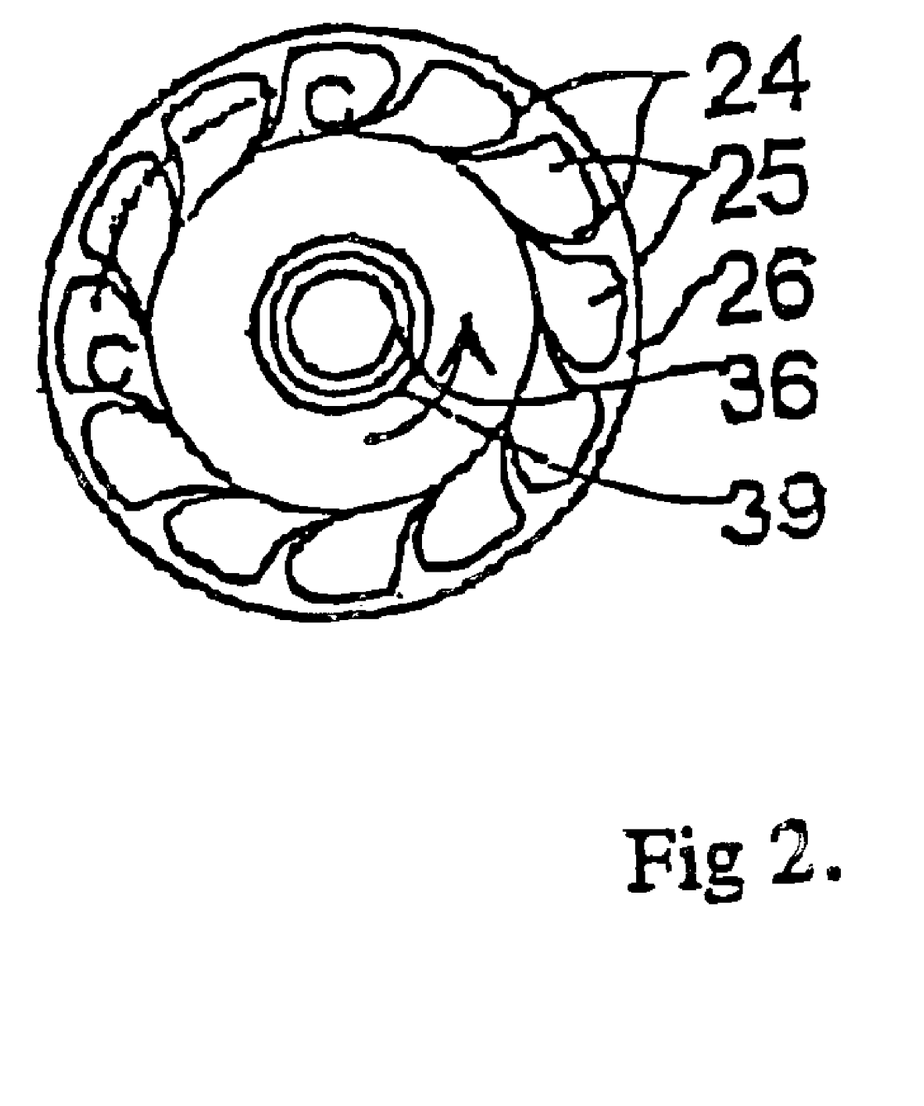
FIG. 2 shows a section of the degassing pump of FIG. 1 along line A—A.

FIG. 2 shows a section A—A of an inlet wheel 26 embodiment with blades 24 attached to the inner wall of the rotor 20 and extending inwards towards the throttle plate 38 in the center of the inlet 22. An arrow indicates the direction of rotation of the rotor 20 and the shovel wheel 26. The blades 24 will impart rotational velocity to the fluid and distribute the fluid onto the rotor wall.

If the blades 24 extend in the direction of the centerline of the rotor, they will impart their own rotational velocity to the fluid, The fluid is thus made to rotate with the same speed as the rotor so that there will be no significant relative peripherical flow of the fluid on the rotor wall. The fluid will flow axially in a thin layer along the rotating wall while the centrifugal forces will make the gas leave the fluid and gather in the center of the apparatus in an open column surrounding the fluid layer.

In the center of the rotor 20 the exhaust pipe 36 is shown surrounded by a guide shaft 39 for the throttle plate 38. A suction source may be connected to the gas exhaust 36 for improving the gas separation or increasing the inlet head. Such use of a suction source is particularly preferred when suction is needed at the source of the mixture of gas and liquid.

Figure 3:
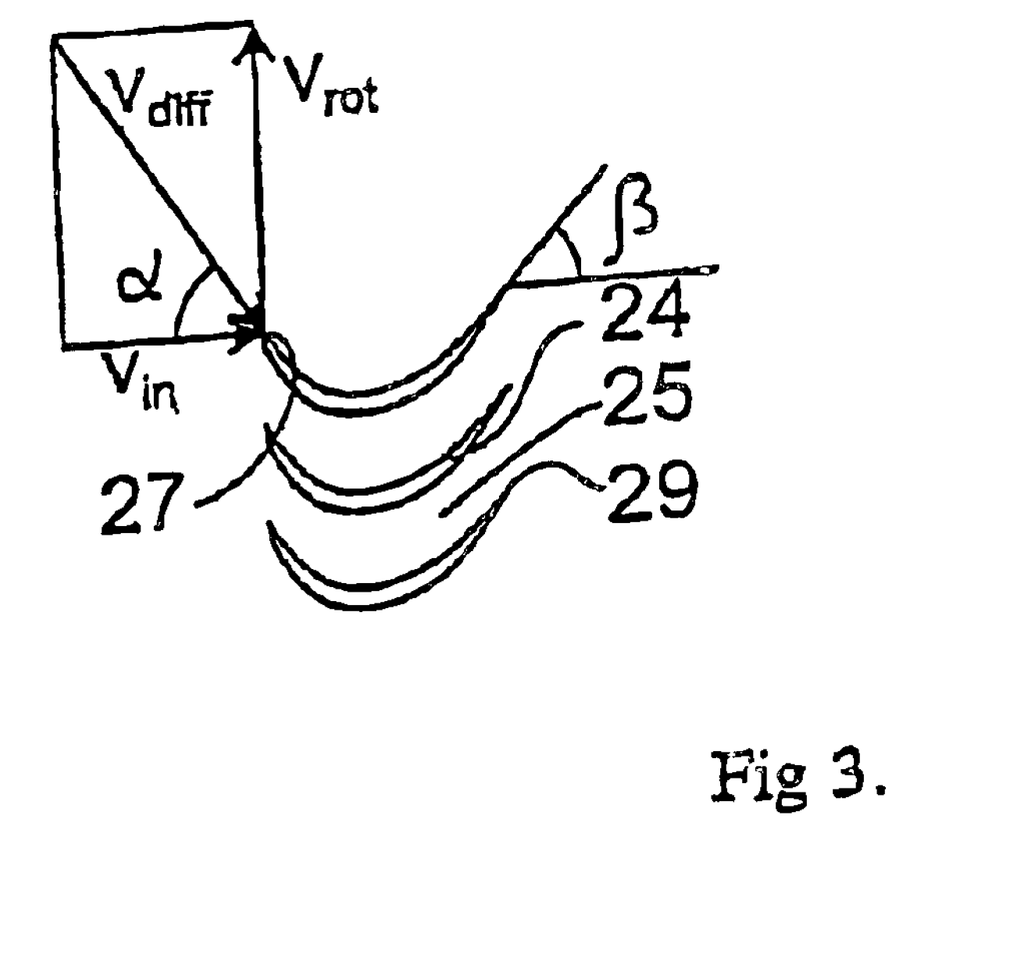
FIG. 3 shows in section the inlet of one embodiment of a degassing pump according to FIG. 1 along line C—C.

A special embodiment of the inlet part of the apparatus is provided when the blades 24 are arcuate in shape, i.e. designed as shovels and extend in the direction of rotation. FIG. 3 shows an embodiment of such arcuate blades taken along section C—C in FIG. 2. The Figure shows the arcuate shape of the shovels 24 and the channels 25 for the fluid between the shovel blades. The shovels have a leading edge 27 extending towards the inlet pipe 14. The leading edge forms an angle $\alpha$ with a line parallel to the centerline of the rotor. The angle $\alpha$ of the leading edge is advantageously designed so that the leading edge 27 will extend in the direction of the relative inlet speed $v_{diff}$ of the fluid. The angle $\alpha$ is preferably between 45 and 70°. The relative inlet speed $v_{diff}$ is the speed difference between the rotor speed $v_{rot}$ and the inlet flow speed $v_{in}$, as represented by their respective vectors in FIG. 3.

The outlet edges 29 of the shovels 24 extend towards the inner wall of the rotor 20 and are directed so that they form an angle $\beta$ with a line parallel to the centerline of the rotor 20. The angle $\beta$ is preferably between 30 and 80°, more preferably between 40 and 70°. The shovel itself forms between leading edge 27 and outlet edge 29 a smooth arcuate shovel form.

The curved and angled shape of the shovels 24 provides a means for directing incoming fluid towards the rotating drum surface in a direction which has a substantial peripheral component in addition to an axial component and at a velocity which is greater than the velocity of the rotating rotor.

When a fluid is accelerated by means of a shovel, the speed difference between the shovel and the fluid will remain constant, but the flow will change direction according to the shape of the shovel. In a rotating shovel wheel, the speed of the shovel is higher at the periphery than in the center, and the speed difference changes correspondingly.

By modifying the geometry of the blades of the inlet wheel of the pump, the direction of the flow differential can be directed more peripherically and less axially, as a result of which the rotating speed of the liquid will be higher than the rotating speed of the rotor.

When the fluid rotates faster than the rotor, the centrifugal force and, thus, the outlet pressure is increased. Also the dynamic energy component, which is transformed to pressure in the outlet pumping spiral, is increased.

By turning the flow in the direction of the rotation of the centrifuge, the axial flow speed may be reduced, and at the same time, the peripherical flow speed increased. In a preferred embodiment the shovels are designed so as to provide a very high rotational speed component and an axial speed component which is low enough to provide an initial tranquil flow on the rotor wall. In such a case there will be no hydraulic jump and the energy losses may be minimized.

The peripherical velocity of the incoming fluid on the rotor wall may be affected in various ways. Thus, the stationary inlet of the apparatus may be designed so as to accelerate the peripheral component of the velocity. This may be done, for example by providing a spiralled tangential inlet, or by providing a stationary accelerating blade arrangement in the inlet for deflecting the fluid peripherically.

When a higher peripherical velocity than the rotor velocity is imparted to the fluid at the inlet, the increased velocity may be used to make the fluid rotate along the drum wall with a higher velocity than that of the drum wall. Alternatively, the drum diameter may be increased thus increasing the peripherical velocity of the drum wall. In a preferred embodiment the drum diameter is increased so that the drum peripherical velocity will correspond substantially to the increased peripherical velocity of the fluid, The actual design of the inlet portion of the apparatus is not critical for the operation of the turbine outlet according to the invention.

Figure 4:
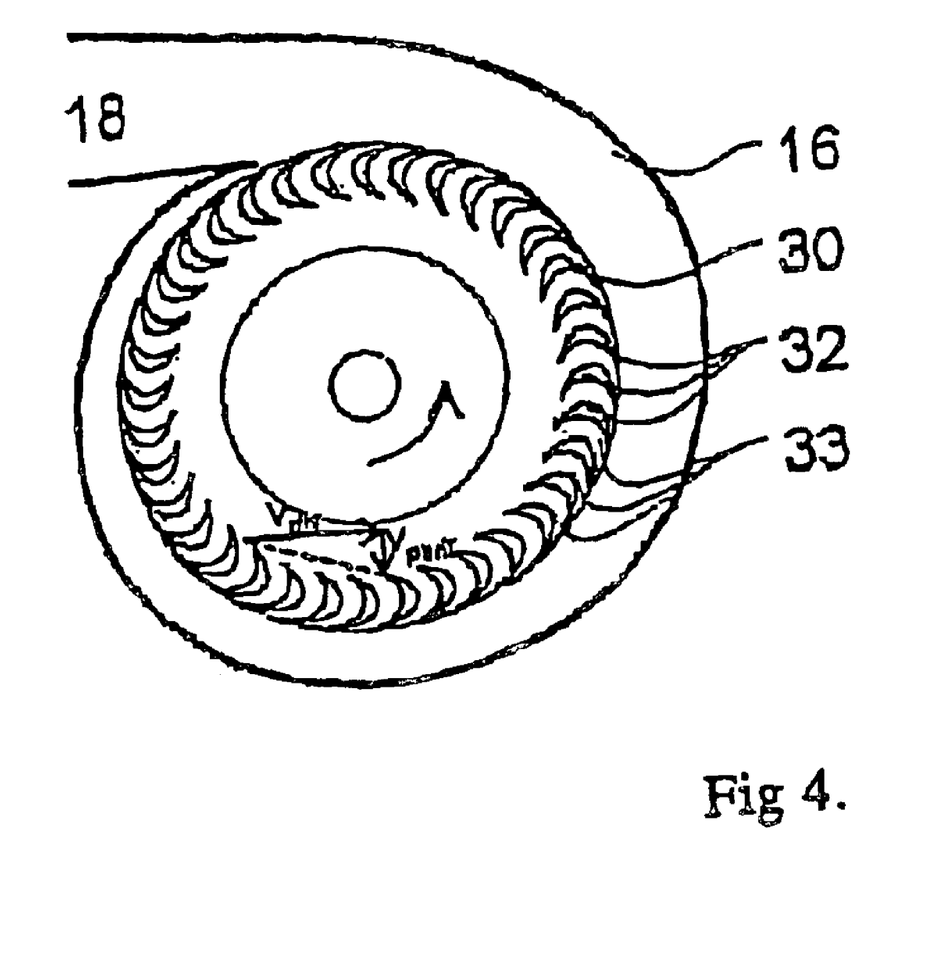
FIG. 4 shows a section of the outlet end turbine according to the invention taken along line B—B of FIG. 1.

FIG. 4 shows the outlet end of the pump 10 with its turbine wheel 30 at section B—B of FIG. 1. The shovels 32 of the turbine wheel 30 form between themselves channels 33 which at their inlet ends are turned so that a fluid having a high peripheral velocity can smoothly flow into the channels 33.

The angle which the channels 33 form against the radius of the rotor 20 is preferably chosen according to the ratio between the radial flow velocity $v_{rad}$ of the fluid and the peripheral velocity difference $v_{diff}$ between fluid and shovel inlet of FIG. 3 so as to provide a desired turbine function at a given constructional degassing and pumping capacity.

At the outer periphery of the turbine wheel 30 the channels 33 are turned in the opposite direction of rotation for decreasing the peripheral velocity of the fluid flow. The channels 33 are preferably narrower at the outer periphery of the turbine wheel 30 than at the inner periphery thereof. The turbine wheel opens into the stationary outlet spiral 16 which generally is spiralled in the direction of the rotation but which may also be spiralled in the direction opposite to the direction of rotation of the rotor.

In the use of the apparatus of the present invention a mixture of gas and a liquid or a liquid suspension is separated into an essentially gas-free liquid and an essentially liquid-free gas. The liquid may be a low viscosity liquid like water, especially backwater in a papermachine, or a higher viscosity liquid or suspension like fiber stock. The gas may be air or another gas substantially lighter than the liquid component of the mixture. Thus, the liquid may contain fibers or impurities such as ink particles to an amount, which does not, however, make the fluid mixture excessively viscous. It is a special advantage of the apparatus according to the invention that it is capable of effectively degassing and pumping the huge volumes fluid circulated within the wet end of a papermachine.

The basic operating principle of the degassing apparatus has been described in the applicant's above mentioned U.S. Pat. No. 5,861,052. It is clear that the turbine of the present invention can be utilized in the outlet end of the apparatus disclosed therein.

Some special features of the invention will now be described more fully in connection with the special embodiment disclosed in FIG. 3 with the arcuate form of the blades (shovels) of the inlet wheel.

During operation of the preferred pump embodiment, a fluid which is to be degassed and pumped flows through the inlet pipe 14 and inlet channel 22 and is distributed by the throttle plate 38 to the channels 25 of the rotating inlet shovel wheel 26. The inlet flow velocity $v_{in}$ of the fluid is determined by the inlet pressure. The direction of the flow velocity forms an angle of substantially 90° against the peripherical rotational velocity $v_{rot}$ of the shovel wheel 26. The velocity difference $v_{diff}$ between shovel wheel and fluid will thus, according to the theorem of Pythagoras, be equal to the square root of the sum of the squares of the inlet flow velocity $v_{in}$ of the fluid and the rotational velocity $v_{rot}$ of the rotor:

$$v_{diff} = \sqrt{v_{in}^2 + v_{rot}^2}$$

This velocity difference will be substantially maintained through the shovel wheel channels 25 and the fluid will flow into the drum 34 with a peripherical velocity corresponding to the peripherical velocity of the drum plus the peripherical component of the velocity difference, $v_{diff} \times \sin(\beta)$. The fluid will have an axial flow velocity corresponding to the axial velocity component of the velocity difference, $v_{diff} \times \cos(\beta)$.

Due to the shape of the shovels 24 the fluid will flow along the drum wall with a velocity having a peripherical component which is higher than the peripheral velocity of the rotor. In other words, the fluid will rotate at a speed which is higher than the speed of the drum. On the other hand the fluid flow will have an axial velocity component which is substantially lower than the axial velocity in the prior art pumps having blades or shovels with their outlet ends extending substantially parallel with the centerline of the rotor.

In a preferred embodiment the fluid flows into the deaeration drum at such a low axial speed that it maintains a tranquil mode of axial flow, i.e. Fr<1. The axial flow may also be moderately rapid or rapid Fr>1 in which case the flow will pass via a hydraulic jump to a tranquil flow mode, A preferred rapid flow is one where Fr is close to 1.

In any case the rotational speed of the rotor is adjusted so, that at the outlet end the axial velocity is tranquil, i.e. Fr<1. Any transition between flow modes happens in a hydraulic jump 40, where the layer thickness suddenly increases and the axial flow speed decreases correspondingly.

In the hydraulic jump 40 a portion of the energy contained in the fluid is destroyed. The flow speeds should therefore be chosen so, that the hydraulic jump either does not occur or is as small as possible. The existence and position of a hydraulic jump 40 in the drum 34 is determined by the flow speed and the energy losses due to friction losses caused by the velocity difference between drum and fluid flow.

At the turbine wheel at the outlet end, the peripherical speed of the fluid is reduced in a way known to persons skilled in the art This velocity difference may be inverted in the turbine wheel. Depending on the section and direction of the channels at the outlet of the turbine wheel, it may even be inverted and increased.

The speed difference transfers energy from the fluid to the rotor. The major part of the released kinetic energy of the fluid can be transformed into driving power for the rotor in the turbine wheel.

By shaping the outlet channels 33 of the turbine wheel 30 narrow enough, and directing them peripherally, also a part of the potential energy of the water ring inside the turbine wheel 30 can be transformed into driving power. Thus, the pressure at the outlet may be reduced, compared to prior art pumps.

The outlet spiral 16 is preferably dimensioned for a flow velocity slightly slower than the peripherally velocity at the outlet of the turbine wheel 30. By this arrangement the energy loss in the spiral due to losses in an ejector are minimized and reduced to mere friction losses. As mentioned above, the spiral may be directed in the direction of rotation or counter to said direction.

In the following the operation and dimensions of a pump according to the preferred embodiment of the present invention will be discussed.

The effect of the feeding angles α is illustrated in the Table below:

| Inlet speed (m/s) | 10 | 10 | 10 |
|---|---|---|---|
| Drum speed (m/s) | 15 | 15 | 15 |
| Speed difference (m/s) | 18 | 18 | 18 |
| Feeding angles (1°) | 0 | 45 | 60 |
| Axial flow speed (m/s) | 18 | 13 | 9 |
| Peripherical flow speed (m/s) | 15 | 28 | 31 |

Thus the axial flow speed is reduced and the peripherical flow speed increased. The increase reduces the energy of the axial flow by half and increases the energy of peripherical flow and simultaneously centripetal force as much as four times.

The changed conditions may be utilized for reducing the speed of the rotation, reducing the size or increasing the capacity of a given centrifuge at a given deaeration requirement.

An increased peripherical speed and increased centripetal force increase the pressure at the outlet end of the centrifuge. In such a deaerating pump the need for providing a further pumping action is decreased, and in accordance with the present invention, the excess energy is recovered in the turbine at the outlet end.

For papermaking processes an outlet pressure of between 100 and 150 kPa is mostly desired. As seen in the table above, this desired pressure is exceeded in most of the bigger deaerating pumps. In accordance with the present invention the excess pressure is transformed into mechanical energy by an outlet wheel functioning as a turbine. In this way, the excess kinetic energy is recovered and may be used for driving the rotor of the deaerating pump.

If the inlet velocity $v_{in}$ of the fluid is, for instance, 10 m/s and the peripheral velocity of the shovel wheel 26 is 15 m/s, the velocity difference is $(10^2+15^2)$, i.e. 18 m/s. At an angle β of 50°, the peripheral velocity component is 13.8 m/s and the axial component 11.5 m/s. The total peripherical velocity is thus 15+13.8=28.8 m/s and the total velocity of the fluid 30.8 m/s. The kinetic energy contained in the fluid corresponds to the mass flow kg/s)×30.8² i.e. 950 Ws/kg.

If losses are disregarded, the peripheral velocity of the fluid in the example is 28.8 m/s at the inside of the turbine wheel. If the diameter of the turbine wheel is 10% bigger than that of the inlet shovel wheel, its peripherical velocity is 16.5 m/s, and the velocity difference 12.3 m/s.

The energy released in the turbine wheel corresponds to $(v_{perif\ in}^2 - v_{perif\ out}^2) \times Q$, where $v_{perif\ in}$ is the peripherical velocity at the inside of the turbine wheel and $v_{perif\ out}$ is the peripherical velocity at the exit of the fluid from the turbine wheel.

In the case of a simple inverting of the velocity difference, the peripherical velocity of the fluid in the example is 16.5 m/s–12.3 m/s, i.e. 4.2 m/s at the outlet of the turbine wheel. Thus a power corresponding to $28.8^2-4.2^2=810$ Ws/kg is being recovered as driving power for the rotor, losses disregarded.

The gas separation pump according to the present invention is especially well suited for recycling paper machine backwater into the short circulation fiber process. FIG. 4 represents a particularly favourable use of gas separation pumps in a process according to the same applicant's U.S. Pat. No. 5,567,278. The disclosure of which is incorporated herein by reference. It is obvious for the person skilled in the art that the present invention offers significant improvement also to conventional papermaking processes, by increasing recycling speed of backwater and eliminating the need for huge backwater tanks.

Figure 5:
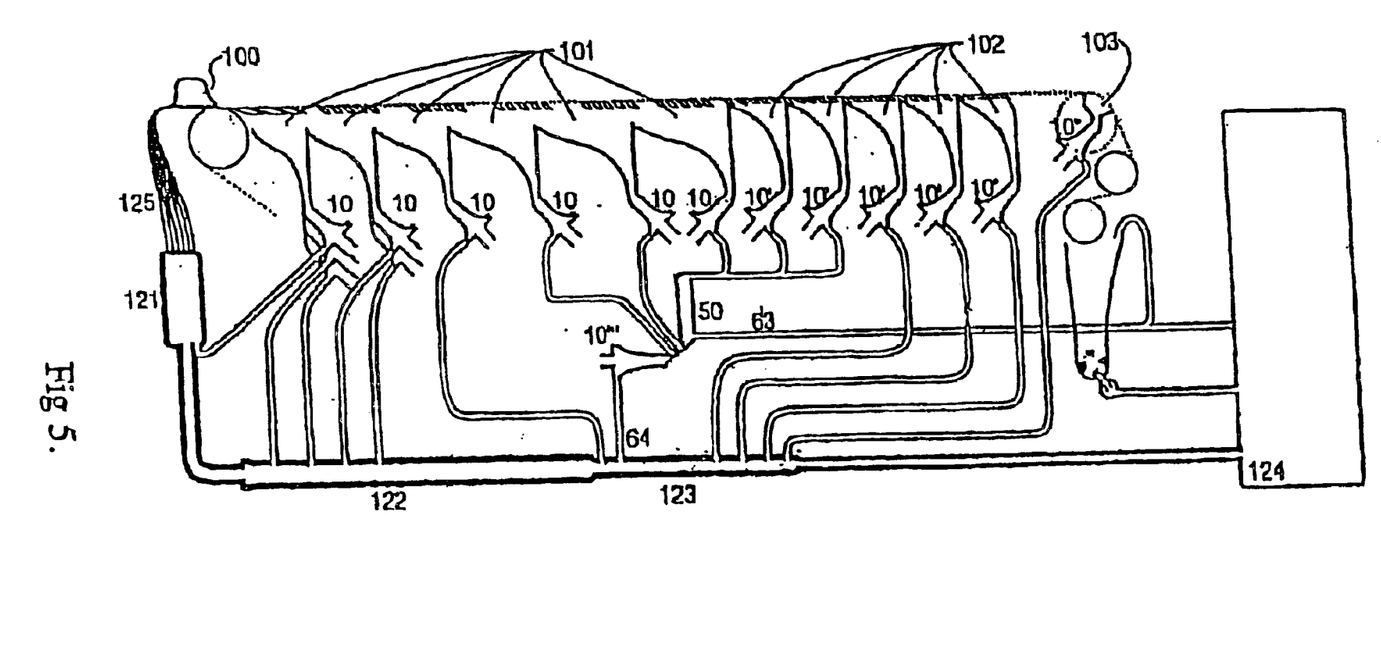
FIG. 5 shows the application of a degassing centrifugal apparatus according to the invention in a papermaking process.

The solution according to FIG. 5 represents a papermaking process, where thin stock is fed through a head box 100 onto a forming wire, for the forming of a web. Backwater draining through the forming wire is collected in drainage boxes 101, suction boxes 102 and the suction roll 103 and flows directly into degassing pumps 10, 10' and 10", according to the present invention. The degassing pumps 10' and 10" relating respectively to suction boxes and to a suction roll may be connected to a vacuum source (not shown) for providing the suction needed in said suction boxes and said suction roll.

The degassing pumps 10, 10' and 10" separate the air contained in the backwater and feed the backwater as separate air free flows to various dilution points in the primary fiber process. Said fiber process goes from stock preparation 124 though a mixer 123, centrifugal cleaner 122, screen 121 and stock distributor 125 to the headbox 100 and further to paper web forming.

The degassing pumps according to the present invention, thus provide means for fast and direct recycling of essentially air free backwater into the fiber process of a papermaking machine wet end.

A process for producing paper or board according to the present invention may be operated in principle according to normal papermaking operations which include the steps of providing a papermaking stock of pulp; diluting said stock in one or more stages with backwater drained through a forming wire of said paper machine; feeding said stock through a head box of said paper machine onto said forming wire; forming a web on said forming wire while allowing water from said stock to drain through said wire; feeding said web through a press section and a drying section of said paper machine to provide paper or board.

Although the degassing apparatus according to the present invention is primarily aimed at achieving an essentially total separation of gas and liquid when pumping a liquid, the pump will also provide great advantages in processes where prior art gas separation pumps are insufficient for pumping fluids wherein the gas is very hard to separate.

The present invention has been described principally as a pump solution relating to the paper industry. It is, however, obvious for the persons skilled in the art that the apparatus can be used for many other purposes when gas is to be removed from a liquid or a liquid suspension.

What is claimed is:

1. A degassing centrifugal apparatus comprising
   a rotatable hollow rotor (20) connected to a fluid inlet (14) at one end and a liquid outlet (16) at the opposite end, and
   having a gas exhaust (36) connected to the center thereof,
   said apparatus having at its inlet end means for bringing a fluid to rotate on the inner wall of said rotor (20)
   and at its outlet end a turbine (30) adapted to be driven by liquid separated from said fluid and flowing from said rotor (20),
   wherein said turbine (30) is configured to recover at least a portion of the dynamic energy contained in a fluid flowing in said rotor (20).

2. The apparatus according to claim 1 wherein said turbine (30) forms part of said rotor structure and is rotatable with said rotor (20).

3. The apparatus according to claim 2 wherein said turbine (30) is located in a pumping zone formed in said rotor (20) at its outlet end.

4. The apparatus according to claim 3 wherein said pumping zone contains a turbine wheel (30) extending into a stationary liquid outlet (16).

5. The apparatus according to claim 4 wherein said turbine wheel (30) comprises shovels (32) forming between themselves arcuate channels (33) which are narrower at the outer periphery than at the inner periphery thereof.

6. The apparatus according to claim 1, wherein said hollow rotor (20) comprises an elongated tubular or conical gas separation drum (34) of an essentially circular cross-section.

7. A process for degassing a fluid by centrifuging, comprising feeding a fluid containing a mixture of liquid and gas into an inlet of a rotating hollow rotor, bringing said fluid to rotate on an inner wall of said rotor, bringing said fluid to flow axially towards a liquid outlet at the opposite end of said rotor while causing said gas to separate from said liquid, directing the resulting degassed liquid into a turbine at said opposite end of said rotor, discharging said degassed liquid through said turbine, and discharging said gas through a central gas exhaust.

8. The process according to claim 7, wherein said degassed liquid is discharged peripherically from said turbine at a pumping pressure.

9. The process according to claim 7, wherein said turbine recovers dynamic energy from said degassed liquid.

10. A process for producing paper or board in a paper machine including the steps of providing a papermaking stock of pulp; diluting said stock in one or more stages with backwater drained through a forming wire of said paper machine; feeding said stock through a head box of said paper machine onto said forming wire; forming a web on said forming wire while allowing water from said stock to drain through said wire; feeding said web through a press section and a drying section of said paper machine to provide paper or board, characterized in that at least a portion of said backwater and/or diluted stock is pumped with at least one degassing centrifugal apparatus comprising a rotatable hollow rotor (20) connected to an inlet (14) for said backwater or stock at one end and an outlet (16) for degassed backwater or stock at the opposite end, and having a gas exhaust (36) connected to the center thereof, said apparatus having at its inlet end means for bringing said backwater or stock to rotate on the inner wall of said rotor (20), and at its outlet end a turbine (30) for recovering energy from said rotating backwater or stock.

* * * * *

UNITED STATES PATENT AND TRADEMARK OFFICE
CERTIFICATE OF CORRECTION

PATENT NO. : 6,723,205 B1 Page 1 of 1
APPLICATION NO. : 09/980281
DATED : April 20, 2004
INVENTOR(S) : Meinander It is certified that error appears in the above-identified patent and that said Letters Patent is hereby corrected as shown below:

On Title Page, Item (73) the Assignee name should read --POM Technology Oy AB--.

Signed and Sealed this

Fifth Day of December, 2006

JON W. DUDAS
*Director of the United States Patent and Trademark Office*